Figure 1:
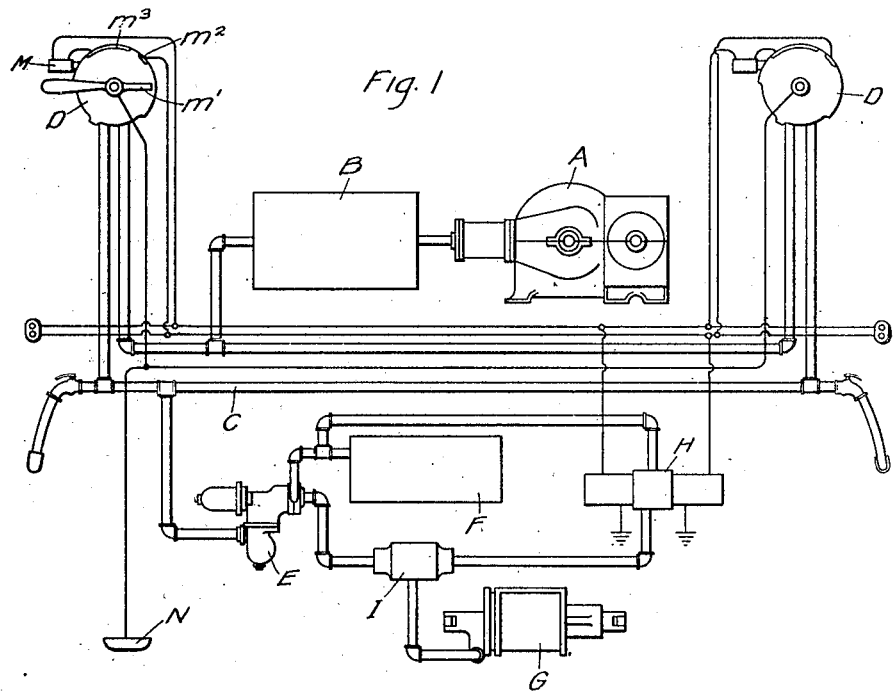

No. 869,444. PATENTED OCT. 29, 1907.
G. MACLOSKIE.
AIR BRAKE SYSTEM.
APPLICATION FILED APR. 7, 1906.

2 SHEETS—SHEET 1.

Witnesses:
Murray D. Badgley
Helen Orford

Inventor:
George Macloskie
By Albert G. Davis
Att'y.

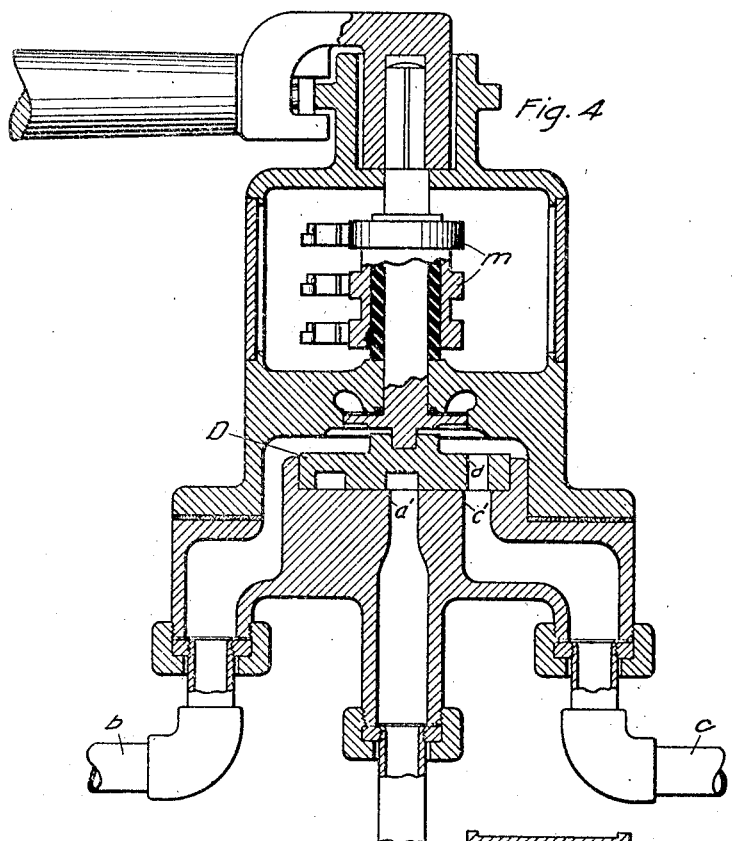

UNITED STATES PATENT OFFICE.

GEORGE MACLOSKIE, OF SCHENECTADY, NEW YORK, ASSIGNOR TO GENERAL ELECTRIC COMPANY, A CORPORATION OF NEW YORK.

AIR-BRAKE SYSTEM.

No. 869,444.  Specification of Letters Patent.  Patented Oct. 29, 1907.

Application filed April 7, 1906. Serial No. 310,415.

*To all whom it may concern:*

Be it known that I, GEORGE MACLOSKIE, a citizen of the United States, residing at Schenectady, county of Schenectady, State of New York, have invented certain new and useful Improvements in Air-Brake Systems, of which the following is a specification.

My invention relates to combined pneumatic and electric air-brake systems, and its object is to provide a combined system having certain advantages not secured heretofore.

Since an electric control can be arranged to give a graduated release of the brakes and a more perfect graduation in application than can be obtained with an automatic pneumatic system, it is desirable in ordinary operation to apply and release the brakes electrically. If, however, the electrically-controlled system fails for any reason, the pneumatic system should be available. Furthermore, it is desirable to employ the same valve-handle for controlling the brakes both electrically and pneumatically. By my invention it is possible to control the brakes in this manner by a single valve-handle without actuating the pneumatic brake-controlling devices while the electric system is being used, and yet, if the electric system fails for any reason, that failure renders the pneumatic system operative, so that the movement of the valve handle to braking position always results in an application of the brakes; this application being secured electrically if the electric system is in operative condition, and pneumatically if the system has failed. In this aspect my invention consists in the combination of pneumatic and electric control systems for the brakes, a single manually-controlled member controlling both systems, and means for automatically rendering the pneumatic control system inoperative when the electric system is in use. More specifically stated, I place switch contacts on the engineer's valve controlling the electric system and employ a normally-open valve in one of the ports of the engineer's valve with a magnet adapted to close this valve so as to render the engineer's valve inoperative when the electric system is in use. If the electric system fails for any reason, as, for instance, by a failure of the current, this magnet is deënergized, and the normally-open valve is returned to open position; thereby automatically putting the engineer's valve into proper condition for pneumatic control of the brakes.

My invention further comprises a novel construction of the electrically-operated brake-controlling valve, whereby a graduated application and release may be obtained in a simple manner, with the electric operating means deënergized during normal running, thereby economizing current, and the valve normally left in release position, so as to prevent accidental application of the brakes due to leakage through the brake cylinder.

Figure 2:
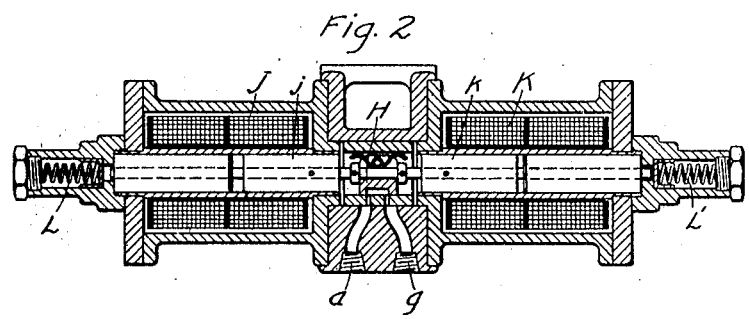
Figure 3:
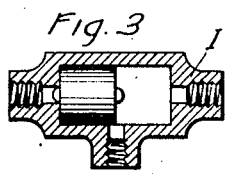

My invention will best be understood by reference to the accompanying drawings, in which Figure 1 shows diagrammatically a combined electric and pneumatic system arranged in accordance with my invention; Fig. 2 shows a cross-sectional view of the electrically-operated brake-controlling valve; Fig. 3 shows in cross-section a double-throw check-valve employed for cutting out the pneumatic and electric brake-controlling devices alternately; Fig. 4 shows a cross-sectional elevation of the engineer's valve arranged in accordance with my invention; and Fig. 5 shows the arrangement of ports in the valve-seat.

Referring first to Fig. 1, A represents an air-compressor supplying the main reservoir B. C represents the train-pipe line normally carrying air under pressure, and arranged to be connected through the engineer's valve D either to reservoir or to atmosphere. E represents the usual triple valve, F the auxiliary reservoir, and G the brake cylinder. H represents an electrically-operated valve adapted to connect brake-cylinder to auxiliary reservoir, or to atmosphere. I represents a double-throw check-valve placed between the brake-cylinder and the valves E and H, arranged to disconnect these valves alternately from brake-cylinder.

The construction of the electrically-operated valve is clearly shown in Fig. 2. The valve H is shown as a simple slide-valve carrying on its spindle the two cores $j$ and $k$ of the solenoids J and K, respectively. L and L′ represent springs which form yielding stops on opposite sides of the valve adapted to be engaged by the ends of the valve spindle. These stops are so spaced that the spindle engages only one at a time, and has a limited free movement between them. The auxiliary reservoir is connected by a port (not shown) with the chamber in which the valve H moves. The port $g$ is connected to brake-cylinder, and the port $a$ to atmosphere. The operation of this valve is as follows: When it is desired to apply the brakes magnet J is energized, drawing the core $j$ over toward the left, and compressing the spring L; thereby moving valve H so as to uncover port $g$, and to connect auxiliary reservoir to brake cylinder. When valve J is deënergized, the spring L returns the valve to lap-position, in which the valve H is displaced toward the left from the position shown in Fig. 2 by the distance between the left-hand end of the valve-spindle and the spring L in this figure. By successively energizing and deënergizing magnet J a graduated application of the brakes is secured. For releasing the brakes magnet K is energized, thereby drawing core $k$ to the right and compressing spring L′. Valve H is thereby moved to a position a little to the right of the position shown in Fig. 2, thereby lapping port $a$. Thus energizing magnet K shifts valve H from one lap-position to another. Now, if magnet K is deënergized, the spring L' returns valve A to the position shown in Fig. 2. This is the release position in which ports $a$ and $g$ are connected, thereby discharging air from the brake-cylinder. Valve K may be energized again after a portion of the air is discharged from the brake-cylinder; thereby again lapping the valve. By successively energizing and deënergizing magnet K a graduated release of the brakes may be obtained. In running, the valve H remains in the position shown, so that an accidental application of the brakes due to leakage of air into the brake-cylinder is prevented, since the brake-cylinders are normally connected to atmosphere. It will be seen that neither magnet J nor K is energized, so that the maximum economy of current is secured.

For controlling magnets J and K suitable conductors are extended through the train, as indicated in Fig. 1. These conductors are connected to contacts controlled by the handle of the engineer's valve. In Fig. 1 a contact $m^1$ is indicated as carried by the handle of the valve, and two contacts $m^2$ and $m^3$ are arranged to be engaged by contact $m^1$. A magnet M is inserted between contact $m^3$ and the train-wire to which it is connected, so that when this train-wire is carrying current to apply the brakes, magnet M is energized. This magnet, as will hereafter be explained, prevents air from being exhausted from the train-pipe, so that the engineer's valve may be moved to application position to apply the brakes electrically without producing any operation of the triple valves on the train. The current for the electrically-operated valves may be taken from any suitable sources indicated by the collector-shoe N.

The operation of the system is as follows: The engineer's valve-handle is shown in running position, in which the train-wires are both disconnected from the source of current. The electrically-operated valves are consequently deënergized, and are in the position shown in Fig. 2. To apply the brakes the handle of the engineer's valve is moved to bring contact $m^1$ into engagement with contact $m^3$. In passing over the contact $m^2$ the magnets K are energized, but this merely moves the electrically-operated valves momentarily to lap-position, from which they are returned to release position as contact $m^1$ passes off of contact $m^2$. When contact $m^1$ reaches contact $m^3$ the magnets J are energized, thereby applying the brakes on the train in the manner that has been described above. At the same time, magnet M is energized, thereby preventing the operation of the pneumatic devices. If, during the application of the brakes, the contact $m^1$ has moved off of contact $m^3$ into the space between contacts $m^3$ and $m^2$, the electrically-operated valves are lapped, as has been heretofore described. This is one lap-position of the engineer's valve. Contact $m^1$ may be moved back into engagement with contact $m^3$ as many times as desired to secure graduated application of the brakes. To release the brakes the contact $m^1$ is moved across contact $m^2$ to the position shown in Fig. 1. This returns the valves to release-position, as has been heretofore explained. If it is desired to lap the valves before the air is entirely exhausted from the brake-cylinders; this can be done by returning the contact $m^1$ into engagement with contact $m^2$; this being the second lap-position of the engineer's valve. In this manner a graduated release may be obtained.

Since the magnet M prevents any reduction of pressure in the train-pipe, it is evident that the pneumatic devices remain inoperative during the electric operation, as above described. If, however, the electric devices should fail for any reason, as, for instance, by failure of the source of current, or by a breaking apart of the train-wires; and if the engineer's valve should then be moved to application position, magnet M would not be energized, and consequently the engineer's valve would act to exhaust the train-pipe and produce an application of the brakes through the triple valves in the manner of an ordinary automatic air-brake system. Furthermore, as will appear from the following description, the engineer's valve is so arranged that for an emergency application the triple valves may be actuated whether the electrically-controlled devices are operating or not.

The construction of the engineer's valve is shown in Figs. 4 and 5. The valve spindle carries both the rotary valve D and the contacts $m$ controlling the electrically-operated valves. The valve seat is provided with three ports. One of these, $c^1$, communicates with the pipe $c$ leading to the train-line. A second port, $a^1$, at the center of the valve-seat is connected to atmosphere through a normally-open valve O controlled by magnet M. The third port $a^2$ in the valve-seat opens directly to atmosphere and is used for emergency applications, while the port $a^1$ is used for service applications. The rotary valve is also provided with three ports, one of which, $d$, is cut through the valve from top to bottom. The top of the valve is in connection with pipe $b$ leading to the main reservoir, so that when the valve-port $d$ is over the port $c^1$ train-line is connected to main reservoir. This is the release-position, and is the position indicated in Fig. 5. The valve has a second port or chamber $d^1$, which has its inner-end always over the port in the valve-seat $a^1$, and which extends radially outward, and is provided with a tapering arc-shaped portion adapted to be brought over port $c^1$ in the valve-seat for service applications. When the port $a^1$ connects ports $c^1$ and $a^1$, the train-pipe is connected to atmosphere through the normally-open valve O. For emergency applications the valve is rotated 180 degrees from the position shown in Fig. 5, which brings the arc-shaped port $a^2$ in the rotary valve into communication with the ports $c^1$ and $a^2$ in the valve-seat. This connects train-line directly to atmosphere and produces an emergency application by the operation of the triple valves whether the electrically-controlled system is in operation or not.

From what has been said above, the operation of the valve will be clear. When the valve is moved to service application position, in which port $a^1$ in the rotary valve connects ports $c^1$ and $a^1$ in the valve-seat, the magnet M is energized if the electrically-controlled system is in proper condition, thereby moving the normally-open valve O to the right, as viewed in Fig. 4, closing the exhaust-port $a^1$ and preventing a reduction of pressure in the train-pipe. The triple valves consequently remain inoperative. If, however, the current should fail, the magnet M would be deënergized, allowing the spring o to return the valve to the position shown in Fig. 4, thereby opening the train-line to atmosphere. The pressure in the train-line would thereby be reduced so as to apply the brakes.
Whether the electric control system is in operation or not, an emergency application of the triple valves can always be obtained by moving the engineer's valve to emergency position, in which port $d^2$ connects port $c^1$ and $a^2$, thereby connecting train-pipe directly to atmosphere.

I do not desire to limit myself to the particular construction and arrangement of parts here shown, but aim in the appended claims to cover all modifications which are within the scope of my invention.

What I claim as new and desire to secure by Letters Patent of the United States, is,—

1. In an air-brake system, an engineer's valve, a train pipe-line controlled thereby, pneumatically-operated brake-controlling devices connected to said pipe-line, electro-magnetic brake-controlling devices independent of said pneumatic devices, train-wires connected to said electric devices, contacts carried by said engineer's valve controlling said train-wires, and means for rendering the pneumatic devices inoperative when the electric devices are in operation.

2. In combination with the brakes of a train, a pneumatic control system for the brakes, an electric control system for the brakes, a single manually-controlled member controlling both systems, and means for automatically rendering the pneumatic system inoperative when the electric system is in use.

3. In combination with the brakes of a train, a pneumatic control system for the brakes, an electric control system for the brakes, a handle, a valve operatively connected to said handle controlling the pneumatic system, switch contacts operatively connected to said handle controlling the electric system, and means for automatically rendering said pneumatic system inoperative when the electric system is in use.

4. In an air-brake system, pneumatically-operated brake controlling devices, a train pipe-line connected thereto, electrically-operated brake-controlling devices, train-wires connected thereto, a handle, a valve operatively connected to said handle controlling the pressure in said pipe-line, switch contacts operatively connected to said handle controlling the current in said train-wires, and means for rendering said valve inoperative when current is flowing through a train-wire.

5. In an air-brake system, pneumatically-operated brake controlling devices, a train pipe-line connected thereto, electrically-operated brake controlling devices, train-wires connected thereto, a handle, a valve operatively connected to said handle controlling the pressure in said pipe-line, switch contacts operatively connected to said handle controlling the current in said train-wires, an automatic valve adapted to render said controlling valve inoperative when current is flowing through a train-wire, and a magnet controlled by said switch contacts controlling said automatic valve.

6. In an air-brake system, pneumatically-operated brake controlling devices, a train pipe-line connected thereto, electrically-operated brake controlling devices, train-wires connected thereto, a handle, a valve operatively connected to said handle controlling the pressure in said pipe-line, switch contacts operatively connected to said handle controlling the current in said train-wires, a normally-open valve adapted to close a port of said controlling valve, and a magnet controlled by said switch contacts adapted to close said normally-open valve.

7. In an air-brake system, pneumatically-operated brake controlling devices, a train pipe-line connected thereto, electrically-operated brake controlling devices, train-wires connected thereto, a handle, a valve operatively connected to said handle controlling the pressure in said pipe-line, switch contacts operatively connected to said handle controlling the current in said train-wires, a normally-open valve adapted when closed to prevent a variation of train pipe pressure by said controlling valve, and a magnet controlled by said switch contacts adapted to close said normally-open valve.

8. In an air-brake system, a brake-controlling valve, a magnet adapted to move said valve to establish braking connections, means for returning said valve to a lap-position when said magnet is deënergized, a second magnet adapted to move said valve to a second lap-position, and means for returning said valve to release-position when the second magnet is deënergized.

9. In an air-brake system, two yielding stops, a brake-controlling valve adapted to reciprocate between said stops and arranged to be in lap-position when in engagement with one stop and in release-position when in engagement with the other stop, a magnet adapted to move said valve from lap- to application- position against the pressure of one of said stops, and a second magnet adapted to move said valve from release to a second lap-position against the pressure of the other stop.

10. In an air-brake system, two yielding stops, a brake-controlling valve adapted to reciprocate between said stops and arranged to be in lap-position when in engagement with one stop and in release-position when in engagement with the other stop, and electrically-controlled means for moving said valve from lap- to application- position against the pressure of one of said stops and from release to a second lap position against the pressure of the other stop.

11. In an air-brake system, a brake-controlling valve, electro-magnetic means for reciprocating said valve, and yielding stops on opposite sides of said valve so spaced that said valve is in engagement with only one of said stops at a time.

12. In an air-brake system, a brake-controlling valve, electro-magnetic means for reciprocating said valve, and yielding stops on opposite sides of said valve so spaced that said valve is in engagement with only one of said stops at a time, said valve being arranged to be in lap-position when in engagement with one stop and in release position when in engagement with the other.

13. In combination with the brakes of a train, a pneumatic control system for the brakes, an electric control system for the brakes, a handle, a valve operatively connected to said handle controlling the pneumatic system and having service and emergency application positions, switch contacts operatively connected to said handle controlling the electric system, and means controlled by said contacts for rendering said valve inoperative in its service application position.

14. In combination with the brakes of a train, a pneumatic control system for the brakes, an electric control system for the brakes, a handle, a valve operatively connected to said handle controlling the pneumatic system and having two exhaust ports for service and emergency applications respectively, a normally-open valve in the service exhaust port, switch contacts operatively connected to said handle controlling the electric control system, and a magnet controlled by said contacts adapted to close said normally-open valve.

15. In an air-brake system, two yielding stops, a brake-controlling valve adapted to reciprocate between said stops and arranged to be in lap-position when in engagement with one stop and in release-position when in engagement with the other stop, and means controllable from a distance for moving said valve from lap- to application position against the pressure of one of said stops and from release to a second lap-position against the pressure of the other stop.

16. In an air-brake system, a brake-controlling valve, means controllable from a distance for reciprocating said valve, and yielding stops on opposite sides of said valve so spaced that said valve is in engagement with only one of said stops at a time, said valve being arranged to be in lap-position when in engagement with one stop and in release position when in engagement with the other.

In witness whereof, I have hereunto set my hand this 5th day of April, 1906.

GEORGE MACLOSKIE.

Witnesses:
BENJAMIN B. HULL,
HELEN ORFORD.